United States Patent [19]

Stahlhuth

[11] Patent Number: 4,769,569
[45] Date of Patent: Sep. 6, 1988

[54] PIEZOELECTRIC STACK MOTOR STROKE AMPLIFIER

[75] Inventor: Paul H. Stahlhuth, Mission Viejo, Calif.

[73] Assignee: Ford Motor Company, Dearborn, Mich.

[21] Appl. No.: 144,910

[22] Filed: Jan. 19, 1988

[51] Int. Cl.[4] .............................. H01L 41/08
[52] U.S. Cl. ...................... 310/328; 310/346
[58] Field of Search ................ 310/328, 346, 366

[56] References Cited

U.S. PATENT DOCUMENTS

| 2,735,025 | 2/1956 | Wiggins | 310/328 |
| 4,193,703 | 3/1980 | Sakmann | 310/328 |
| 4,318,023 | 3/1982 | O'Neill et al. | 310/328 |
| 4,613,782 | 9/1986 | Mori et al. | 310/328 X |
| 4,633,118 | 12/1986 | Kosugi | 310/328 |
| 4,672,257 | 6/1987 | Oota et al. | 310/328 |

OTHER PUBLICATIONS

SAE Paper #800502, 1980, entitled "Piezomotors—Electromechanical Muscle", by C. G. O'Neill, D. S. Randall, and P. C. Smiley.

Primary Examiner—Mark O. Budd
Attorney, Agent, or Firm—Paul K. Godwin, Jr.; Clifford L. Sadler

[57] ABSTRACT

An amplifier mechanism which utilizes the electroexpansion characteristics of a pair of piezoelectric stack motors pivotally mounted in a rigid frame to directly contact and move with the output actuator element of the mechanism. The stack motors are mounted in opposition in a saggital arrangement so as to provide counterbalanced lateral forces that are manifested in longitudinal amplified movement of the output actuator element.

8 Claims, 1 Drawing Sheet

PIEZOELECTRIC STACK MOTOR STROKE AMPLIFIER

BACKGROUND OF THE INVENTION

Related Application

This application is related to my earlier U.S. application Ser. No. 07/041,237, filed on 1/6/88 and entitled Double Saggital Stroke Amplifier.

FIELD OF THE INVENTION

This invention relates to the field of mechanical amplifier mechanisms and more specifically to the area of stroke amplifiers which use electroexpansive actuators.

DESCRIPTION OF THE PRIOR ART

As noted in my earlier application, several piezoelectric (electroexpansive) actuators have been described in the prior art in association with electromechanical amplifier mechanisms. Most prior art devices utilize levers and saggital linkages to produce a motion amplification wherein a high force short stroke of a piezoelectric actuator is amplified by the mechanism to a longer stroke movement at a lower force.

In U.S Pat. No. 4,318,023 (incorporated herein by reference), two embodiments of saggitally amplified mechanisms are described which utilize lever arms pivotally connected to a fixed base support and driven by length changes induced in an electroexpansive actuator. Depending upon the embodiment, the mechanisms illustrate techniques that provide a push or a pull force output stroke that is amplified with respect to the input expansion/contraction length changes provided by the actuator. In the 1980 SAE Paper No. 800502 entitled "Piezo Motors - Electromechanical Muscle", by O'Neill, et al (incorporated herein by reference), the properties and construction of piezoelectric actuators (piezo motors) of both the electroexpansive and electrocontractive types are described and shown as being employed in electromechanical amplification devices.

U.S. Pat. No. 4,193,703 describes the use of a pair of fixed "piezo crystal transducers" that are simultaneously actuated to drive the ends of a buckling spring. The center of the buckling spring is connected to a printing needle so that the needle is driven longitudinally with respect to the amplified movement occurring at the midpoint of the buckling spring.

SUMMARY OF THE INVENTION

The present invention is intended to provide a direct connection between an actuating piezo motor and the actuatable element that provides the output stroke from the amplifier. That is accomplished by the described embodiment which includes a pair of matched piezoelectric stack motors, having identical electroexpansive characteristics, pivotally mounted within a rigid frame in a saggital arrangement so as to be nonperpendicular with respect to the actuatable element. The opposing ends of the two actuating piezo motors are disposed to directly and pivotally contact a longitudinally movable rod of the actuatable element that provides the output stroke from the amplifier. Since the piezo motors are pivotally mounted, the forces resulting from their expansions cause the actuator rod to move longitudinally a distance which is greater than the expansion distances of both the piezo motors. However, the lateral forces applied against the longitudinally movable rod are balanced.

Thermal compensators are also employed between the end points of the piezo motors and the pivoting points to provide a thermally stable mechanical amplifier.

The present invention provides improved efficiencies over mechanisms found in the prior art, by employing: a rigid framework to contain the forces; a balanced distribution of all forces not contributing to the movement of the actuatable element; a nonflexible output member to minimize lost motion due to elastic deformation of the output member; a thermally stable mechanism; and low friction/no play pivot mounts that allow movement of the actuators with the output stroke element.

It is, therefore, an object to the present invention to provide an electromechanical amplifier mechanism capable of achieving high efficiency mechanical stroke amplification by direct interconnection between an electroexpansive actuator and the stroke element.

It is a further object to the present invention to provide an electromechanical stroke amplifier whereby lateral forces applied to the stroke element are balanced by the use of a plurality of electroexpansive actuators disposed in a saggital arrangement with respect to a rigid framework and nonperpendicular with respect to the stroke element.

DETAILED DESCRIPTION OF THE PREFERRED EMBODIMENT

Figure 1:
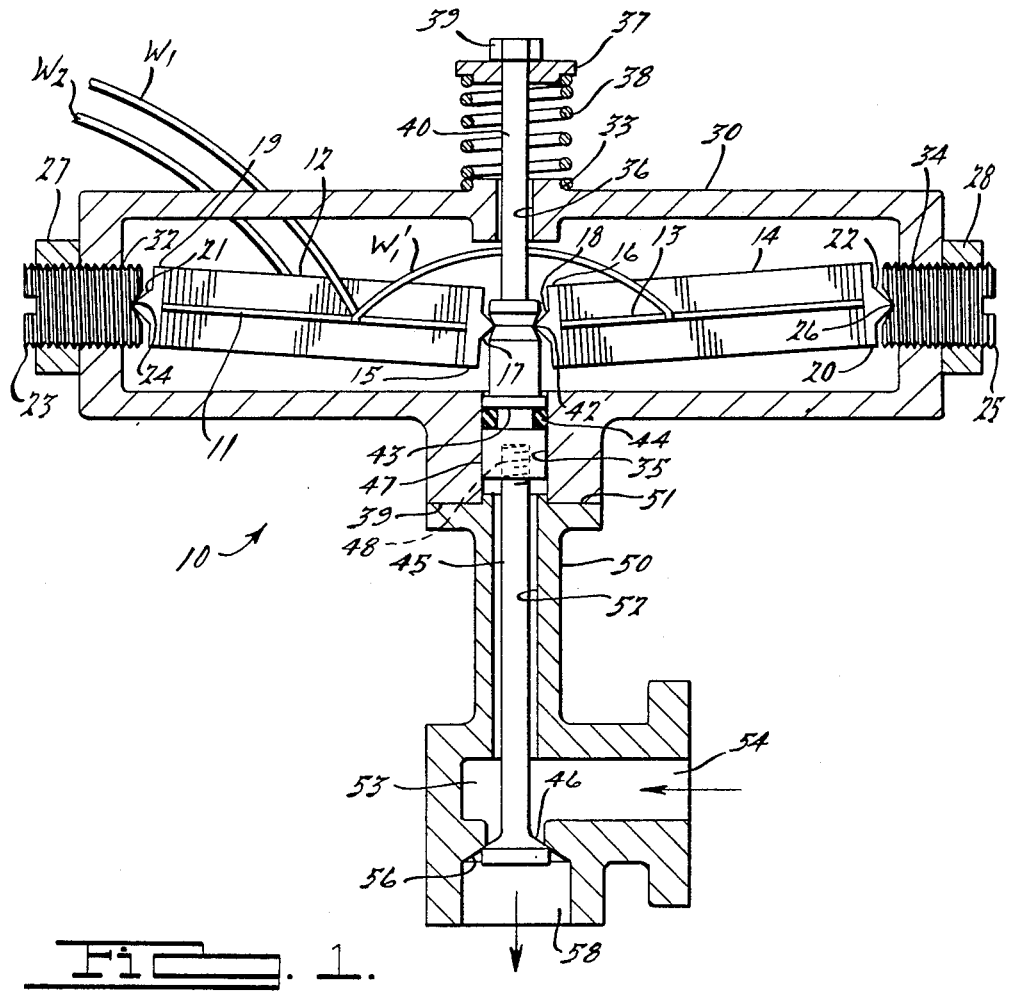
FIG. 1 is an elevational cross-section of the preferred embodiment of the present invention.

The electromechanical stroke amplifier 10 of the present invention, shown in FIG. 1, is assembled to control a hot gas valve within a valve housing 50. Although stroke amplifiers may be used to control valves of the type shown in FIG. 1, they are also usable wherever a fast, reliable and precise stroke output movement is desired.

The amplifier mechanism 10 includes a pair of piezoelectric stack motors (actuators) 12 and 14 that are electroexpansive. In this case, the piezoelectric stack motors 12 and 14 are configured of a plurality of piezo crystal disks separated by electrically conductive foil. Bus bars 11 and 13, shown on stack motors 12 and 14, are connected to every other conductor interstitially located between the piezo crystal disks. Similarly, bus bars on the opposite sides (not shown) of the stack motors 12 and 14 are connected to the others of the interstitially located conductors so that upon application of a predermined electrical voltage on wires $W_1$ and $W_2$, the appropriate electrical field will be applied across each piezo crystal disk. The total length expansion resulting in each of the piezo motors 12 and 14 is an accumulation of the individual disk expansions.

A rigid frame 30 is formed to provide support and preloading of the piezo motors 12 and 14 and to insure that all forces provided by those electroexpansive actuators are directed to the output stroke of the amplifier. The rigid frame 30 contains a lower aperture 35 and an upper aperture 36. The two apertures 35 and 36 are coaxial and slightly larger than the actuatable rod 40 shown mounted therein. The actuator rod 40 is mounted coaxially in the apertures 35 and 36 so that it may be moved bidirectionally along its longitudinal axis.

The rod 40 includes a notched element 42 that serves as the direct contact point for the ends of both piezo motors 12 and 14. The opposing sides of the piezo motors 12 and 14 contain thermal compensator end caps 15 and 16, that in turn contain knife edge tips 17 and 18. The knife edge tips 17 and 18 serve as pivot fulcrums by mating with the notched element 42 and allow low friction transfer of expansion forces from the piezo motors 12 and 14 to the rod 40.

In the embodiment shown, it is desired to provide a "push" output stroke from the rod 40, through the lower aperture 35 of the amplifier mechanism 10. A spring 38 is seated between a frame seat 33 and a rod seat 37 to provide an upward "pulling" bias to the rod 40 and restore the rod 40 to its initial position when the piezo motors 12 and 14 are deenergized.

The frame 30 also contains threaded apertures 32 and 34 into which set screws 23 and 25 are respectively driven. The set screws 23 and 25 respectively contain pivot sockets 24 and 26 that are used to provide support and preloading to the piezo motors 12 and 14. The thermal compensator end caps 19 and 20 contain protruding tips 21 and 22 that mate with the pivot sockets 24 and 26 and provide for low friction pivoting mounting of the corresponding piezo motors 12 and 14. Jam nuts 27 and 28 are threaded onto the respective set screws 23 and 25 in order to lock the screws in place after they have been adjusted to their desired settings.

Although the pivot points in this embodiment use knife edges and pivot sockets under compression, it should be appreciated that the pivots could also be configured as flexures or pin joints and remain within the inventive concept.

The frame 30 of the amplifier mechanism 10 is shown joined to a valve housing 50. The lower surface 39 surrounding lower aperture 35 abuts the upper surface 51 of the valve housing 50. The valve housing 50 contains a central passage 52 that extends from the upper surface 51 to a lower valve chamber 53. A hot gas inlet 54 provides the access to the valve chamber 53 and is normally connected to a pressurized supply of hot gas.

A valve stem 45 extends through the central passage 52 and contains an enlarged conically shaped valve portion 46 that is normally held closed in a valve seat 56 defined in a discharge area 58 of the valve housing 50. The upper end of the valve stem 45 is directly connected to the output of the amplifier 10 through a piston 47 that is also attached to the rod 40. An O-ring seal 44 is provided above the piston 47 and below a flange 43 on the rod 40. The O-ring seal 44 and the piston 47 together serve to prevent the pressurized gases from leaking and adding additional heat to the amplifier mechanism.

Although not specifically stated above, FIG. 1 clearly shows the piezo motors 12 and 14 to be pivotally mounted in the frame 30 so as to be nonperpendicular, with respect to the actuatable rod 40. The reason for that requirement is described with reference to FIG. 2.

Figure 2:
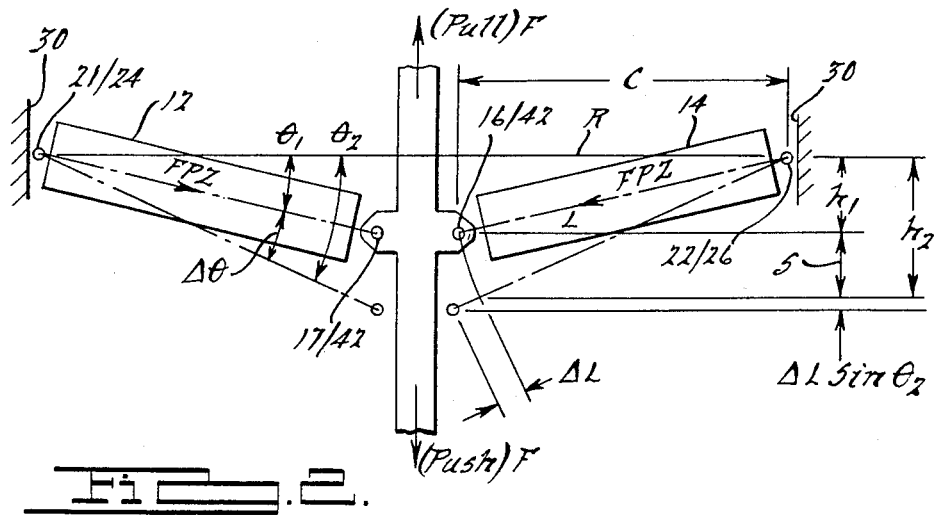
FIG. 2 is schematic diagram illustrating the relative movement of the various elements employed in the preferred embodiment shown in FIG. 1.

FIG. 2 is a schematic diagram that illustrates the geometric relationships of the components that comprise the amplifier mechanism 10 shown in FIG. 1 and how those relationships change when the piezo motors 12 and 14 are energized to expand their respective length dimensions "L" by an amount "ΔL".

In FIG. 2, the piezo motors 12 and 14 are shown as lying in a common plane, and the longitudinal axis of the actuatable rod 40 is intersected by the longitudinal axes of the respective motors. From a reference line "R" defined between the mounting pivots 21/24 and 22/26 as being perpendicular to the longitudinal axis of the actuatable rod 40, the longitudinal axes of the piezo motors 12 and 14 are shown as each defining an angle $\theta_1$. Upon energization of both the piezo motors 12 and 14, they each expand their lengths L by a distance $\Delta L$ and, since the lateral forces are in balance, the piezo motors pivot with respect to points 21/24 and 22/26 to a new angle $\theta_2$. A longitudinal movement of the rod 40 results, since the pivot connections 17/42 and 16/42 are transported as the piezo motors are pivoted to the new angle $\theta_2$. This stroke output movement of the rod 40 is expressed as "S" and is a result of the selected component relationships. In this case, "$h_1$" is used to define the offset distance that the pivot connection point 16/42 (and 17/42) measures from the reference line R; and "C" is the distance between the pivot points 22/26 and 16/42 (also between pivot points 21/24 and 17/42) as projected parallel to the longitudinal axis of the rod 40. As a result:

$$h_1 = L \sin\theta_1 = C \tan\theta_1; \text{ and}$$

$$L = \frac{C \tan\theta_1}{\sin\theta_1} = \frac{C}{\cos\theta_1}$$

Upon energization of the piezo motors 12 and 14, their lengths each expand by a distance $\Delta L$ and the offset distance that the pivot point 16/42 (and 17/42) now measures from reference line R is defined as "$h_2$".

$$h_2 = (L + \Delta L) \sin\theta_2 = C \tan\theta_2$$

The difference between $h_2$ and $h_1$ is the output stroke "S" of the amplifier mechanism and "A" is defined as the amplification ratio (S/ΔL).

The following relationships assist the designer in selecting the appropriate sized components to achieve the desired results:

$$S = h_2 - h_1 = C \tan\theta_2 - C \tan\theta_1$$

$$A = \frac{S}{\Delta L} = \frac{\tan\theta_2 - \tan\theta_1}{\frac{1}{\cos\theta_2} - \frac{1}{\cos\theta_1}}$$

The size of the actuator is related to the dimension C and is a function of the required output stroke S, where:

$$C/S = \frac{1}{\tan\theta_2 - \tan\theta_1}$$

The output force "F" from the amplifier mechanism 10 is related to the forces "$F_{pz}$" provided from the piezo motors 12 and 14 and varies (increases) over the stroke output as follows:

$$F = 2 \times F_{pz} \sin\theta$$

Although the embodiment shown provides a "push" stroke output, it should be pointed out that the mechanism could also be adapted to provide a "pull" stroke output be merely reversing the output connection on the rod 40 to the end in which the end cap 39 is now indicated.

The frame 30 was formed from a rigid material having a coefficient of thermal expansion that is higher than the coefficient of thermal expansion of the piezo motors 12 and 14. Without thermal compensation components, the amplifier would produce output movement or undesired prestress if the enviornmental temperatures varied. Therefore, in order to stabilize the mechanism over the enviornmental temperature range, thermal compensation of the amplifier mechanism 10 was provided. Such thermal compensation was achieved through the thermal expansion characteristics of the thermal compensator end caps 15, 16, 19 and 20. The material and lengths of the end caps were selected to compensate for the thermal expansion characteristics of the frame 30, as opposed to the thermal expansion characteristics of the piezo motors 12 and 14. The coefficient of thermal expansion for the end caps 15, 16, 19 and 20 was selected to be higher than that of both the frame 10 and the piezo motors 12 and 14. The combined lengths of the compensator end caps 15, 16, 19 and 20 are related to the lengths of the piezo motors 12 and 14 and the length of the frame 30 by the relationship $$L_C = \frac{\alpha_F L_F - \alpha_P L_P}{\alpha_C}$$

where:
$L_C$=combined lengths of compensators measured parallel to R;
$\alpha_C$=thermal expansion coefficient of compensator material;
$\alpha_F$=thermal expansion coefficient of frame material;
$L_F$=length of frame between pivot points 21/24 and 22/26;
$\alpha_P$=effective thermal expansion coefficient of piezoelectric composite stack motors 12 and 14; and
$L_P$=combined lengths of piezo motors 12 and 14 measured parallel to R.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. An electromechanical stroke amplifier comprising:
a relatively rigid frame for supporting the active components of said amplifier;
an actuatable element mounted in said frame for bidirectional movement along a first axis;
spring means connected between said frame and said actuatable element for resisting movement of said actuatable element in one direction along said first axis and for biasing said actuatable element to an initial position;
electroexpansive means pivotally mounted to contact both said frame and said actuatable element and responsive to the application of a predetermined voltage to expand its length dimension by a predetermined amount between said contacted frame and actuatable element and responsively causing said actuatable element to move against the bias of said spring means and said electroexpansive means to pivot therewith a distance that is greater than said predetermined amount of length expansion provided by the electroexpansive means.

2. An amplifier as in claim 1, wherein said electroexpansive means includes a pair of piezoelectric elements having their length dimensions extending along respective second and third axes that intersect said first axis and each piezoelectric element is pivotally mounted to contact both said frame and said actuatable element and to pivotally move with said actuatable element.

3. An amplifier as in claim 2, wherein said piezoelectric elements are stack motors that have identical length dimensions and response characteristics and each expand their length dimensions by said predetermined amount when said predetermined voltage is applied.

4. An amplifier as in claim 3, wherein said frame contains a plurality of set screws oriented for adjustment along their respective screw axes that intersect said first axis and said set screws each contain a pivoting socket into which one end of an associated piezoelectric stack motor is mated for pivotal mounting and contact.

5. An amplifier as in claim 3, wherein said frame contains a pair of set screws positioned in spaced opposition and said set screws each contain pivoting sockets for mounting and contacting the ends of said piezoelectric stack motors and each being adjustable along an axis that intersects said first axis of said actuatable means to provide preload pressure between said frame and said actuatable element through said piezoelectric stack motors.

6. An amplifier as in claim 5, wherein said frame is formed of a material having a higher thermal coefficient of expansion than that of the piezoelectric stack motors and said piezoelectric stack motors each contain thermal compensating elements formed of a material having a thermal coeffecient of expansion that is higher than that of both said frame and said piezoelectric stack motors to maintain a constant preload pressure between said set screws and said actuatable element over the operating range of environmental temperatures.

7. An amplifier as in claim 2, wherein said actuatable element is an elongated rod having a notched portion for mounting and contacting said piezoelectric stack motors and located at a position on said rod so that said second and third axes corresponding to the length dimensions of said piezoelectric stack motors will intersect said first axis at a predetermined nonperpendicular angle.

8. An amplifier as in claim 6, wherein thermal compensating elements are formed as end caps on each end of the piezoelectric stack motors and each contain a protruding tip that mates with the pivoting sockets in said set screws.

* * * * *